(No Model.) 2 Sheets—Sheet 1.
T. A. BRIGGS.
COMPOUND LEVER.
No. 480,450. Patented Aug. 9, 1892.
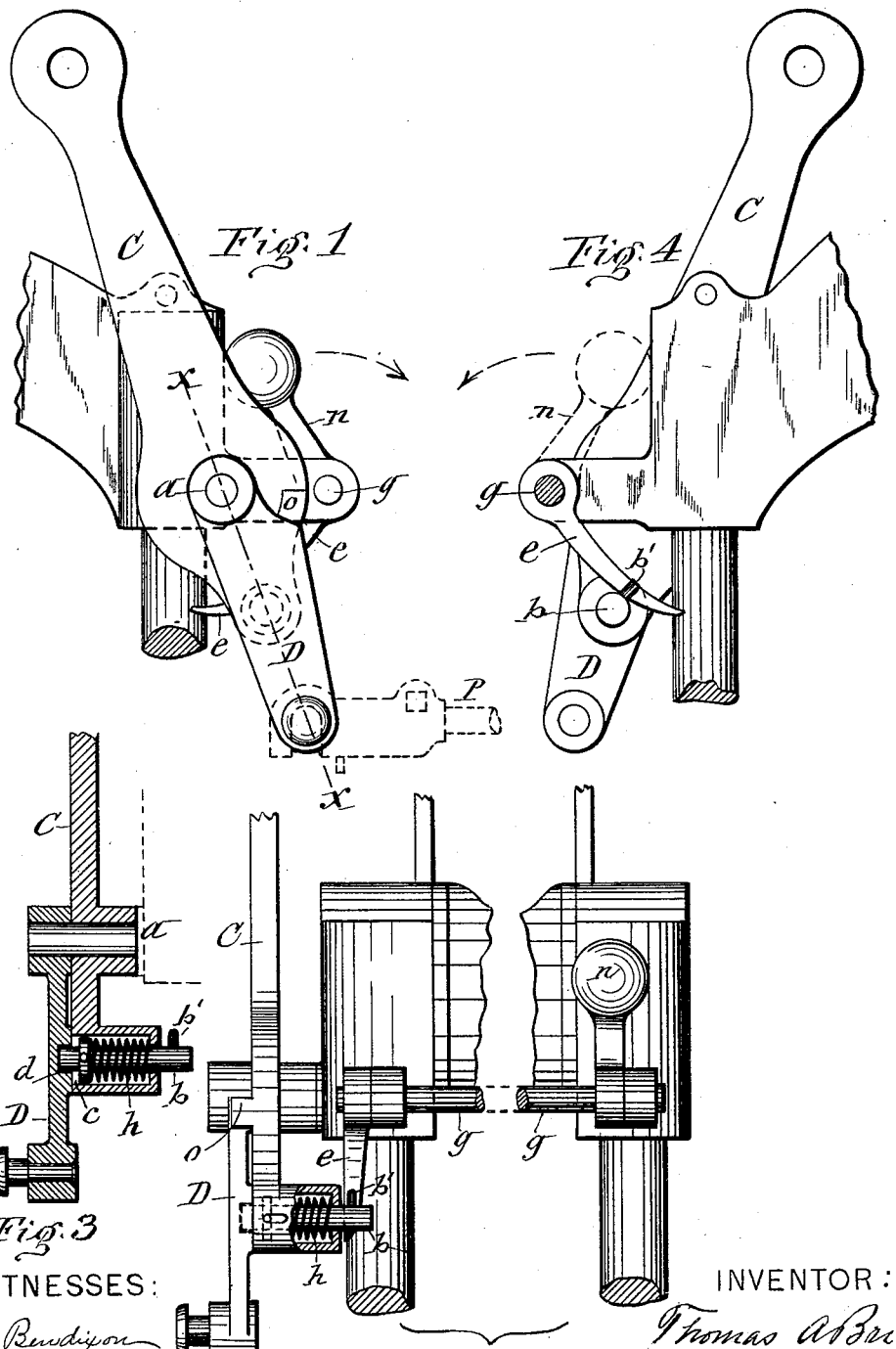

(No Model.)  
2 Sheets—Sheet 2.
T. A. BRIGGS.
COMPOUND LEVER.
No. 480,450.     Patented Aug. 9, 1892.
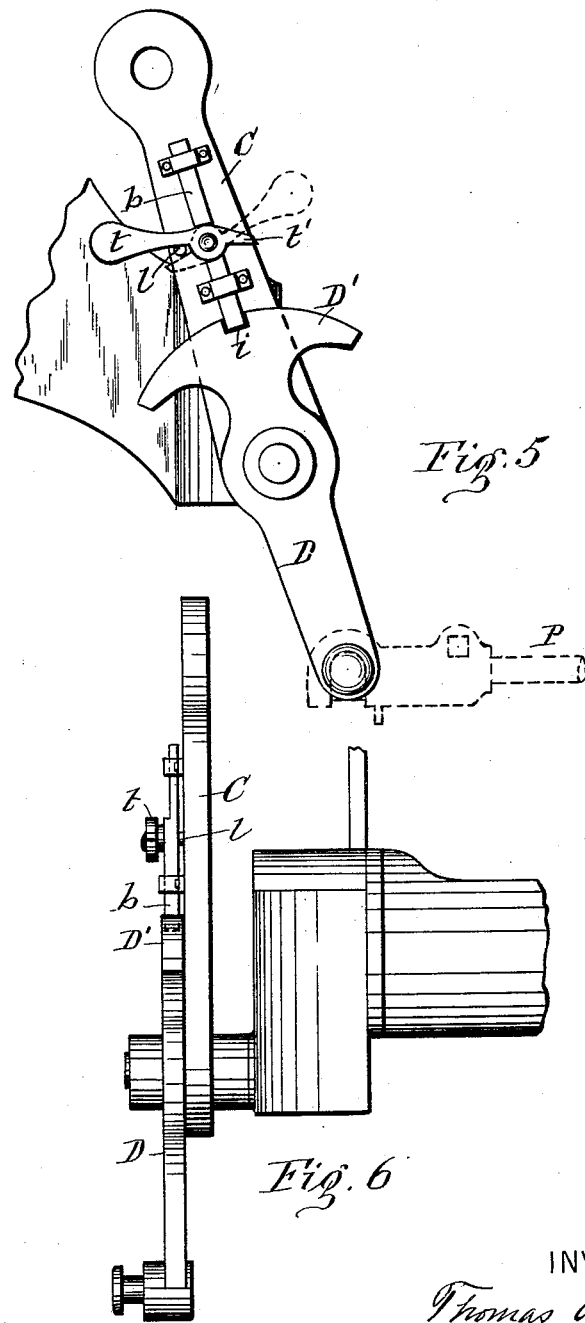
WITNESSES:
C. L. Bendixon
J. J. Saasy
INVENTOR:
Thomas A. Briggs
By Hull, Laass & Hull
his ATTORNEYS.

UNITED STATES PATENT OFFICE.

THOMAS A. BRIGGS, OF ARLINGTON, MASSACHUSETTS.

COMPOUND LEVER.

SPECIFICATION forming part of Letters Patent No. 480,450, dated August 9, 1892.

Original application filed November 24, 1891, Serial No. 412,989. Divided and this application filed March 5, 1892. Serial No. 423,815. (No model.)

*To all whom it may concern:*

Be it known that I, THOMAS A. BRIGGS, of Arlington, in the county of Middlesex, in the State of Massachusetts, have invented new and useful Improvements in Compound Levers, of which the following, taken in connection with the accompanying drawings, is a full, clear, and exact description.

This invention consists, essentially, in the combination, with a pivoted lever, of an arm pivoted to said lever and clutch members definitely located on said parts and adapted to lock and unlock the same to and from each other, and thus allow the arm to either transmit motion to the lever or move independently of the lever and leave the lever at rest, as may be desired. A species of said combination is embodied in a paper-feeding machine shown and described in a prior application for Letters Patent, Serial No. 412,989, filed November 24, 1891, of which my present application is a division.

My present invention also consists in certain novel features of the details and auxiliary devices connected therewith, as hereinafter fully described, and set forth in the claims.

In the annexed drawings, Figure 1 is a side view of a lever embodying my invention. Fig. 2 is an edge view of the same. Fig. 3 is a longitudinal section on line $x\ x$ in Fig. 1. Fig. 4 is a rear view of the lever and devices connected therewith. Fig. 5 is a front view of a modification of my invention, and Fig. 6 is an edge view of the same.

Similar letters of reference indicate corresponding parts.

C represents a lever or rock-arm, which is pivoted to a suitable support, as indicated at $a$. To this lever at any suitable point in the length thereof is pivoted an arm D, preferably at the pivot $a$ of the lever, and thus pivoted concentric therewith. Said lever may be connected to any machine in which it is adapted to perform a useful function, and the free end of the arm D may be connected either to a pitman P or other part of the machine, imparting an oscillatory motion to said arm. In order to allow the said arm to transmit motion to the lever C, I employ clutch members definitely located on said parts, so that at a certain time during the movement of the arm D it can be locked on the lever C. Said clutch members or locking devices are susceptible of various modifications in their details of construction. Figs. 1, 2, 3, and 4 illustrate my preferred construction, which consists of the eye $c$, extending transversely through the lever and a socket $d$ in the adjacent side of the arm D and equidistant from the center $a$. In the eye $c$ slides a bolt $b$, which is adapted to enter into the socket $d$ during the oscillations of the arm D. A suitable spring $h$ forces the bolt toward the said arm, and thus causes the bolt to automatically enter the socket $d$ when the same is in position to register with the eye $c$. The engagement of the bolt with the socket of the arm D* locks the latter on the lever C, so as to compel the lever to move with the arm.

In order to cause the lever to be automatically unlocked from the arm when desired, I provide the bolt $b$ with a laterally-projecting lug $b'$ and mount on the frame of the machine a revoluble shaft $g$ parallel with the axis of the lever, to which shaft I affix a cam $e$, which is curved and tapered longitudinally and adapted to be thrown into the path of the lug $b'$ by turning the said shaft, and when in said position the cam presses the lug $b'$ rearward and withdraws the bolt $b$ from the socket $d$ during the oscillation of the arm D and lever C, and thus unlocks said parts from each other.

To retain the cam $e$ either in or out of the path of the lug $b'$, I attach to the shaft $g$ a gravity lever or handle $n$, which is weighted at its free end, and when in a suspended position it sustains the cam out of the path of the aforesaid lug of the bolt, and by swinging the said gravity-lever up past a vertical position and allowing it to rest on the frame of the machine the cam is thrown into the path of the lug $b'$, and thereby draws the bolt automatically out of the socket $d$ of the arm D.

$o$ represents a lug or abutment, which projects from the side of the lever C, and is in such a position as to come in contact with one of the edges of the arm D, and thereby arrest its movement in one direction at the exact time when the socket $d$ is in line with the bolt $b$, which latter is thus allowed to readily enter the socket $d$ and to be easily withdrawn therefrom when desired. The edges of the socket and the end of the bolt are thus relieved from wear and abrasion, and the bolt is also relieved from shearing strain during the movement of the lever C and arm D in one direction. I do not, however, wish to be limited specifically to the aforesaid clutch connection between the lever C and arm D, inasmuch as a similar effect may be produced by connecting the sliding bolt $b$ to the lever C, as represented in Figs. 5 and 6 of the drawings, in which the arm D is formed with a segment D', provided with a notch $i$, which the aforesaid bolt is adapted to enter, and thus lock the lever to the arm. To throw the bolt in and out of engagement with the notch $i$, I pivot to the bolt the gravity-lever $t$, which is weighted at one end and formed with an extension $t'$ at the opposite end. A lug $l$ projects from the lever C at one side of the bolt $b$ in such a position that by swinging the gravity-lever $t$ to one side of the bolt and bringing it to bear on top of the lug said lever lifts the bolt out of the notch $i$, and by swinging the said lever to the opposite side of the bolt and bringing the extension $t'$ of the lever to bear on the under side of the lug $l$ said lever forces the bolt down, so as to enter the notch $i$ during the oscillation of the arm D.

Having described my invention, what I claim as new, and desire to secure by Letters Patent, is—

1. The combination, with a pivoted lever, of an arm pivoted to said lever, a bolt movably connected to one of said parts and adapted to engage and release the other of said parts, and a gravity-lever actuating the bolt, as set forth.

2. The combination of the pivoted lever C, provided with the eye $c$, the arm D, pivoted to said lever and provided with the socket $d$, the bolt $b$, sliding in the aforesaid eye and adapted to enter the socket, the lug $b'$, projecting laterally from the bolt, and the cam $e$, adapted to be thrown in the path of the lug to automatically unlock the bolt during the movement of the lever, as set forth.

3. In combination with the pivoted lever C, provided with the eye $c$, and the arm D, pivoted to said lever and provided with the socket $d$, the bolt $b$, sliding in the aforesaid eye, a spring forcing said bolt toward the socket $d$, a lug $b'$, projecting laterally from the bolt, a revoluble shaft parallel with the axis of the lever, the cam $e$ on said shaft, adapted to fall into the path of the aforesaid lug, and a gravity-lever attached to the aforesaid shaft to hold the cam in its requisite position in relation to the lug $b'$, substantially as described and shown.

4. In combination with the lever C, provided with the eye $c$, and the arm D, pivoted to said lever and provided with the socket $d$, the bolt $b$, sliding in said eye and adapted to enter the socket, and the abutment $o$, projecting from the lever and in position to arrest the movement of the arm in one direction and at a point to bring the socket $d$ in line with the bolt, substantially as and for the purpose set forth.

In testimony whereof I have hereunto signed my name this 29th day of February, 1892.

THOMAS A. BRIGGS. [L. S.]

Witnesses:
WILLIAM H. H. TUTTLE,
RAYMOND BUFFUM.